US012676053B2

United States Patent

(12) United States Patent
Levesque et al.
(10) Patent No.: US 12,676,053 B2
(45) Date of Patent: Jul. 7, 2026

(54) GAME AWARD ENHANCEMENT FOR ADJACENT GAME SYMBOLS

(71) Applicant: IGT, Las Vegas, NV (US)

(72) Inventors: Derek Levesque, Cranston, RI (US); Christopher Wright, Canton, GA (US); Ray Latham, Farnworth (GB); Jo Mills, Hatch Warren (GB)

(73) Assignee: IGT, Las Vegas, NV (US)

( * ) Notice: Subject to any disclaimer, the term of this patent is extended or adjusted under 35 U.S.C. 154(b) by 390 days.

(21) Appl. No.: 18/087,082

(22) Filed: Dec. 22, 2022

(65) Prior Publication Data

US 2024/0212449 A1 Jun. 27, 2024

(51) Int. Cl.
*G07F 17/32* (2006.01)
*G07F 17/34* (2006.01)

(52) U.S. Cl.
CPC ...... *G07F 17/3267* (2013.01); *G07F 17/3211* (2013.01); *G07F 17/34* (2013.01)

(58) Field of Classification Search
CPC ... G07F 17/3267; G07F 17/3211; G07F 17/34
See application file for complete search history.

(56) References Cited

U.S. PATENT DOCUMENTS 10,726,678 B1 * 7/2020 Rehill .................. G07F 17/326
2001/0009865 A1 * 7/2001 Demar .................. G07F 17/32 463/20
2003/0050111 A1 * 3/2003 Saffari .............. G07F 17/3255 463/25
2003/0209598 A1 * 11/2003 Dollhopf ............... G07D 11/40 235/375
2004/0166922 A1 * 8/2004 Michaelson ............ G07F 17/34 463/20
2005/0056995 A1 * 3/2005 Tempest ................. G07F 17/34 463/20
2006/0100019 A1 * 5/2006 Hornik ............... G07F 17/3206 463/42
2007/0057464 A1 * 3/2007 Cockrell .................. A63F 1/00 273/303
2008/0039190 A1 * 2/2008 Walker .................... G07F 17/32 463/25
2008/0146346 A1 * 6/2008 Hardy .................. G07F 17/329 463/16
2008/0188288 A1 * 8/2008 Seelig ................ G07F 17/3202 463/20
(Continued)

*Primary Examiner* — Jeffrey K Wong
(74) *Attorney, Agent, or Firm* — SHERIDAN ROSS P.C.

(57) ABSTRACT

A processor circuit of a gaming device and/or gaming system determine a first game symbol associated with a first game award value at a first game symbol position of an array of game symbol positions, and a second game symbol associated with a second game award value is determined at a second game symbol position of the array of game symbol positions. A first total game award value is determined for a game award based on the first game award value and the second game award value. Based on a further determination that the first game symbol position is adjacent to the second game symbol position in the array, the first total game award value of the game award is increased to a second total game award value, and the game award comprising the second total game award value is awarded.

20 Claims, 16 Drawing Sheets

(56) References Cited

U.S. PATENT DOCUMENTS

| | | | | |
|---|---|---|---|---|
| 2008/0242421 | A1* | 10/2008 | Geisner | A63F 13/75 463/42 |
| 2011/0009197 | A1* | 1/2011 | Peltz | G07F 17/3246 463/46 |
| 2012/0064961 | A1* | 3/2012 | Vancura | G07F 17/3265 463/20 |
| 2015/0072750 | A1* | 3/2015 | Rinaldis | G07F 17/3258 463/19 |
| 2016/0063799 | A1* | 3/2016 | Reeves | G07F 17/326 463/17 |
| 2016/0358424 | A1* | 12/2016 | Thomas | G07F 17/3272 |
| 2017/0092069 | A1* | 3/2017 | Pececnik | G07F 17/3269 |
| 2017/0372558 | A1* | 12/2017 | You | G07F 17/3267 |
| 2022/0051525 | A1* | 2/2022 | Mizzi | G07F 17/34 |
| 2024/0112542 | A1* | 4/2024 | Mirjavadi | G07F 17/3213 |

* cited by examiner

GAME AWARD ENHANCEMENT FOR ADJACENT GAME SYMBOLS

BACKGROUND

Embodiments described herein relate to game play features with electronic wagering games, and in particular to providing a game award enhancement for adjacent game symbols in a gaming environment, such as in a casino environment, and related devices, systems, and methods. In many wagering games, such as number match games and slot games, certain elements or combinations of elements may cause a bonus game to be initiated. There is a continuing need for solutions that provide periodic rewards to players to incentivize continued play and other types of desirable wagering behaviors.

BRIEF SUMMARY

According to some embodiments, a system includes a processor circuit and a memory comprising machine-readable instructions. When executed by the processor circuit, the instructions cause the processor circuit to receive a wager for a wagering game at a gaming device, the wagering game comprising an array of game symbol positions. The instructions further cause the processor circuit to determine a first game symbol associated with a first game award value at a first game symbol position of the array of game symbol positions. The instructions further cause the processor circuit to determine a second game symbol associated with a second game award value at a second game symbol position of the array of game symbol positions. The instructions further cause the processor circuit to determine a first total game award value for a game award based on the first game award value and the second game award value. The instructions further cause the processor circuit to determine whether the first game symbol position is adjacent to the second game symbol position in the array. The instructions further cause the processor circuit to, based on a determination that the first game symbol position is adjacent to the second game symbol position in the array, increase the first total game award value of the game award to a second total game award value. The instructions further cause the processor circuit to award the game award comprising the second total game award value.

According to some embodiments, a gaming device includes a display device, an input device, a processor circuit, and a memory comprising machine-readable instructions. When executed by the processor circuit, the instructions cause the processor circuit to receive a wager for a wagering game at the input device of the gaming device, the wagering game comprising an array of game symbol positions. The instructions further cause the processor circuit to determine a plurality of game symbols at a plurality of game symbol positions in an array of game symbol positions, each game symbol of the plurality of game symbols associated with a respective game award value. The instructions further cause the processor circuit to, based on a determination that a first plurality of game symbols are adjacent to each other, determine a first subtotal game award value based on the respective game award values of the first plurality of game symbols. The instructions further cause the processor circuit to increase the first subtotal game award value of the game award to a second subtotal game award value. The instructions further cause the processor circuit to, based on a determination that a second plurality of game symbols are adjacent to each other, determine a third subtotal game award value based on the respective game award values of the second plurality of game symbols. The instructions further cause the processor circuit to increase the third subtotal game award value of the game award to a fourth subtotal game award value. The instructions further cause the processor circuit to award a game award comprising the second subtotal game ward value and the fourth subtotal gaming award value at the gaming device.

According to some embodiments, a method includes receiving a wager for a wagering game at a gaming device, the wagering game comprising an array of game symbol positions. The method further includes determining, by a processor circuit of the gaming device, a plurality of game symbols at a plurality of game symbol positions in the array of game symbol positions, each game symbol of the plurality of game symbols associated with a respective game award value. The method further includes determining, by the processor circuit, a first total game award value for a game award based on the plurality of respective game award values. The method further includes determining, by the processor circuit, for each game symbol of the plurality of game symbols, whether the game symbol position of the game symbol is adjacent to a game symbol position of another game symbol of the plurality of game symbols. The method further includes, based on a determination that a plurality of game symbols are adjacent to each other, increasing, by the processor circuit, the first total game award value of the game award to a second total game award value. The method further includes awarding the game award at the gaming device.

DETAILED DESCRIPTION

Figure 1:
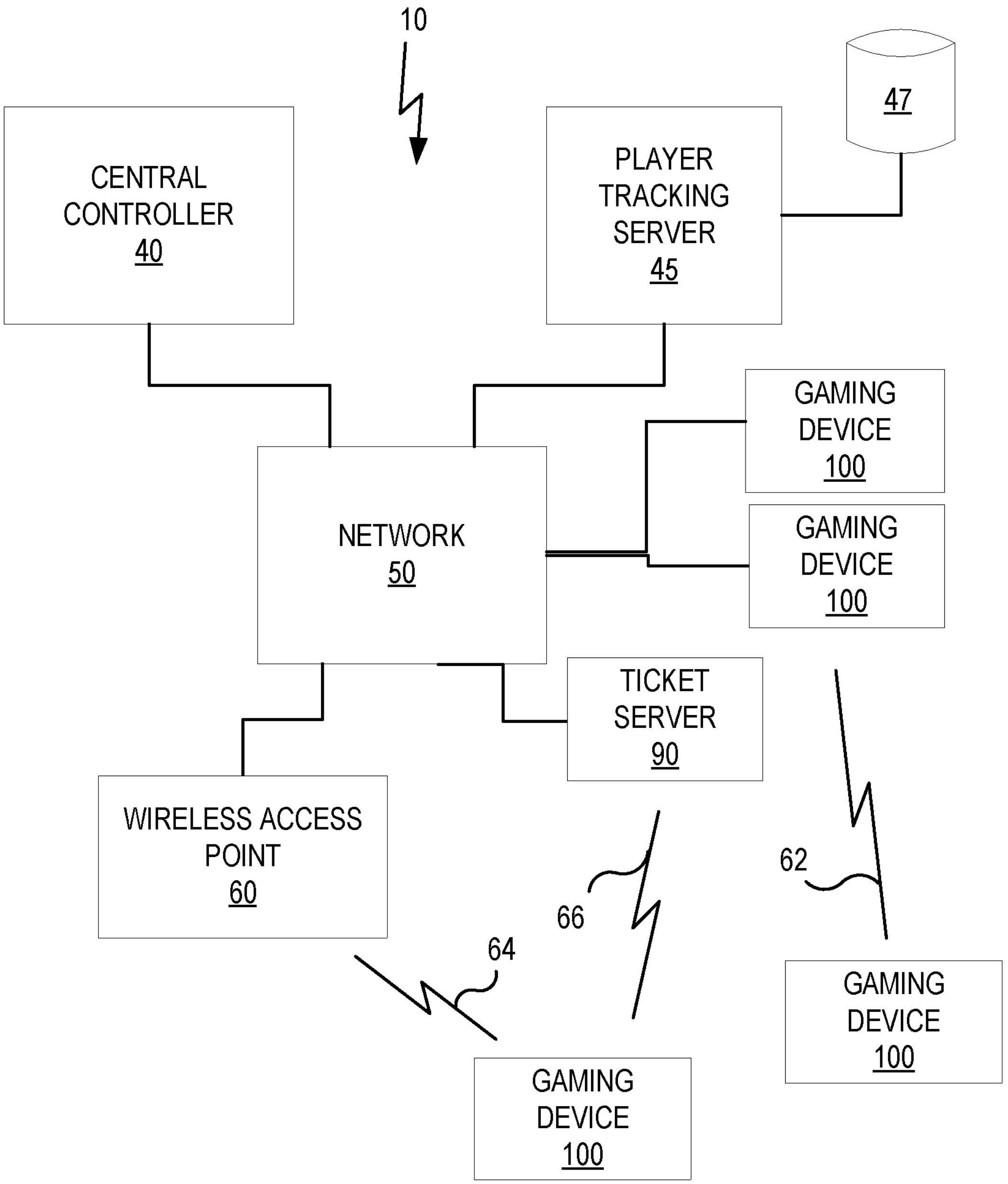
FIG. 1 is a schematic block diagram illustrating a network configuration for a plurality of gaming devices according to some embodiments.

Embodiments described herein relate to game play features with electronic wagering games, and in particular to providing a game award enhancement for adjacent game symbols in a gaming environment, such as in a casino environment, and related devices, systems, and methods. For example, a system may include a processor circuit and a memory storing machine readable instructions that cause the processor circuit to receive a wager for a wagering game at a gaming device, the wagering game comprising an array of game symbol positions. A first game symbol associated with a first game award value is determined at a first game symbol position of the array of game symbol positions, and a second game symbol associated with a second game award value is determined at a second game symbol position of the array of game symbol positions. The processor circuit determines a first total game award value for a game award based on the first game award value and the second game award value, and determines whether the first game symbol position is adjacent to the second game symbol position in the array. Based on a determination that the first game symbol position is adjacent to the second game symbol position in the array, the first total game award value of the game award is increased to a second total game award value, and the game award comprising the second total game award value is awarded.

One example of a wagering game that can incorporate these and other features is a key number match game, in which prizes are associated with matching selected numbers during play. Numbers are revealed as part of an array, and in addition to the base prizes associated with the matching numbers, an additional reward may be provided if the matching numbers are adjacent each other in the array, such as by increasing a multiplier for some or all of the base game award. The multipliers may increase, e.g., to 2×, 3×, 5×, 10×, 25×, 50, based on increasing numbers of adjacent matching numbers in the array. The multiplier increases may be linear, e.g., proportional to the number of adjacent matching numbers, or non-linear, with the multiplier increasing by larger amounts for larger numbers of adjacent matching numbers. For example, a multiplier value of the multiplier may be proportional to a total number of adjacent game symbols associated with game award values, such that the multiplier increases in a linear progression. Alternatively, the multipliers may increase in a non-linear progression, e.g., from 2× for 2 adjacent matching numbers, to 4× for three adjacent matching numbers, to 10× for four matching numbers, etc., such that a proportion of the multiplier value to the total number of adjacent game symbols associated with game award values increases at a higher rate, e.g., geometrically, exponentially, etc., or according to any other non-linear progression, as desired. For example, for a multiplier value of the multiplier that is not proportional to a total number of adjacent game symbols associated with game award values, a first ratio of a first multiplier associated with a first number of adjacent game symbols may be lower than a second ratio of a second multiplier associated with a second number of adjacent game symbols higher than the first number of adjacent game symbols. Before describing these and other features in greater detail, reference is now made to FIG. 1, which illustrates a gaming system 10 including a plurality of gaming devices 100. The gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
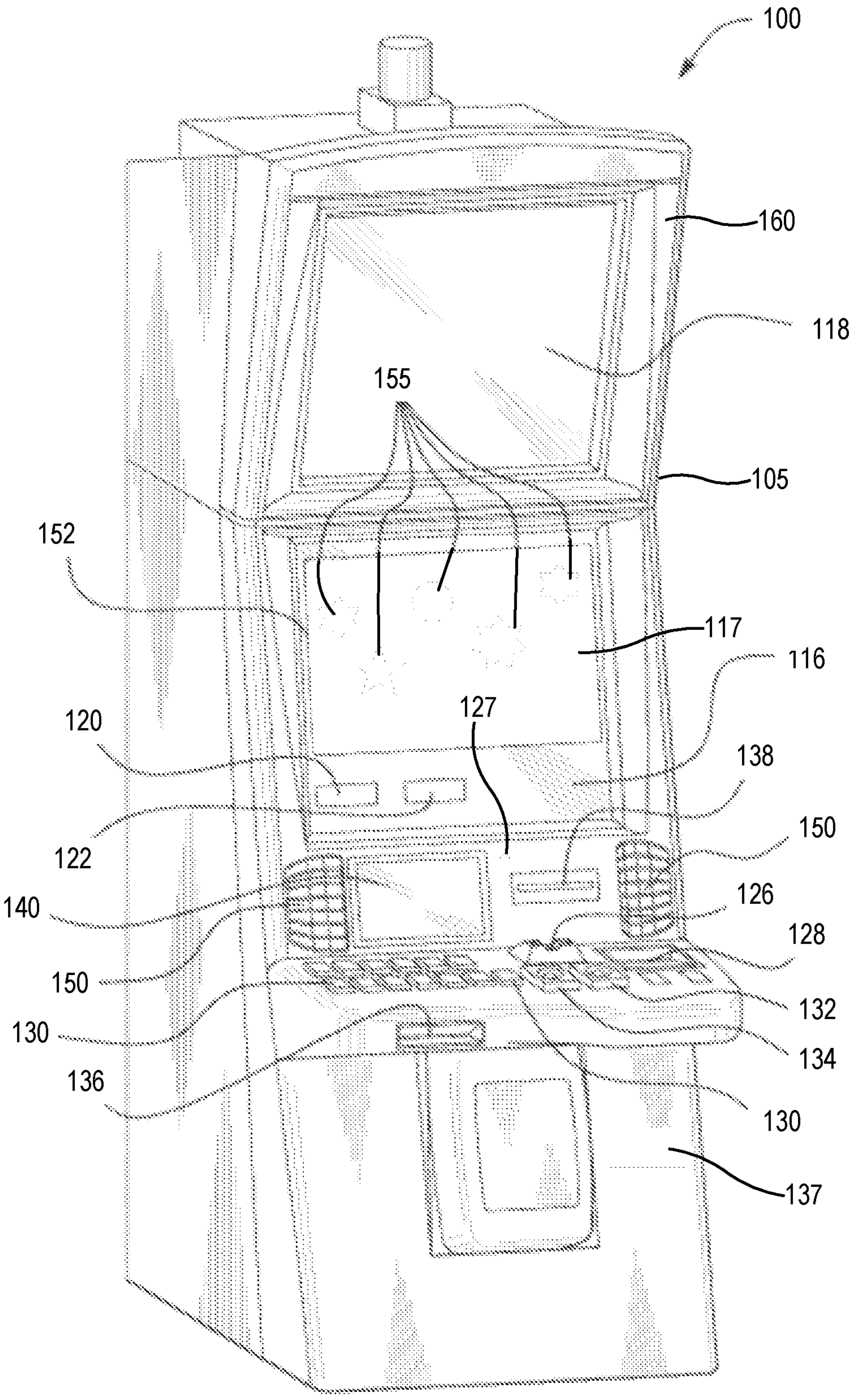
FIG. 2A is a perspective view of a gaming device that can be configured according to some embodiments.
Figure 2B:
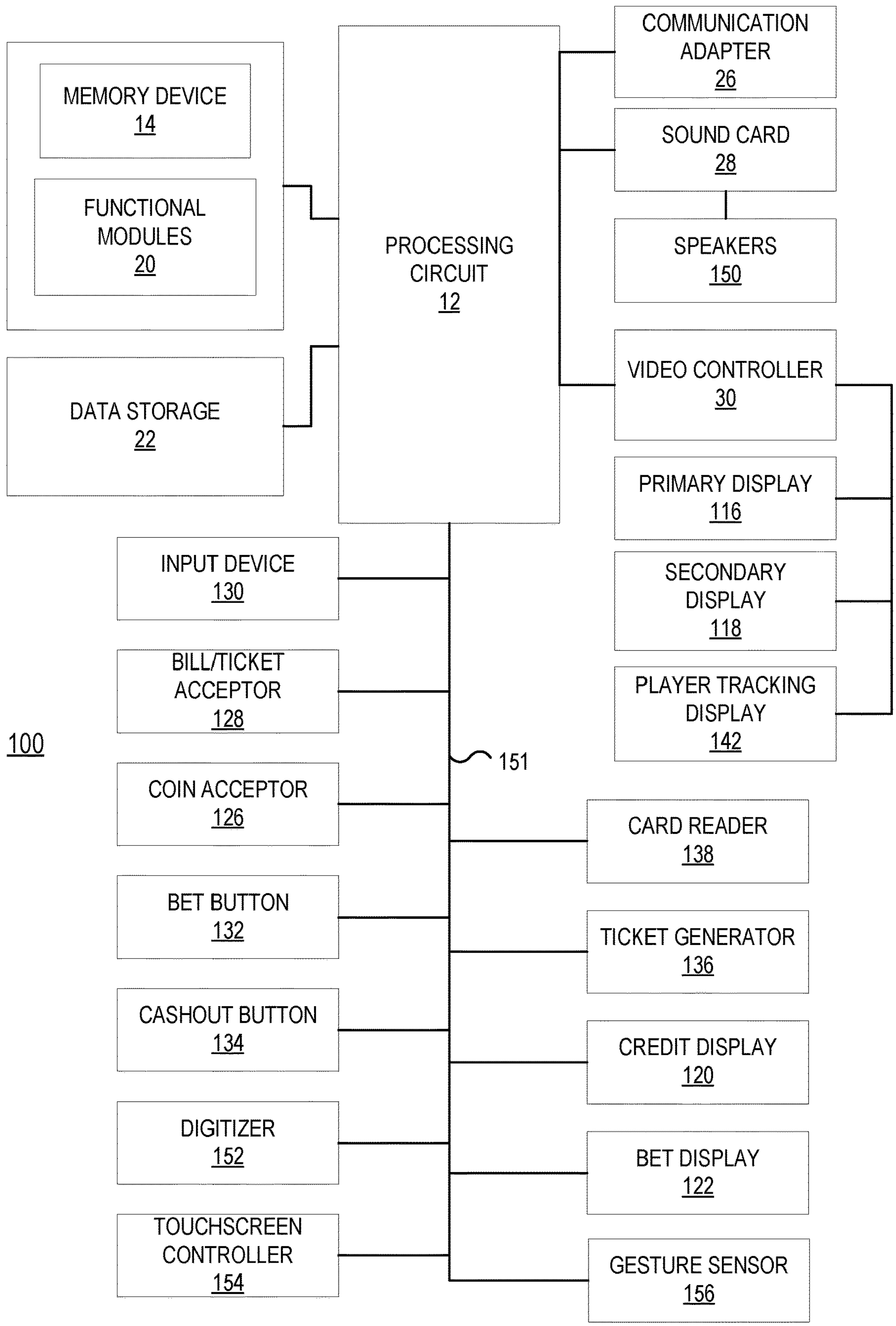
FIG. 2B is a schematic block diagram illustrating an electronic configuration for a gaming device according to some embodiments.
Figure 2C:
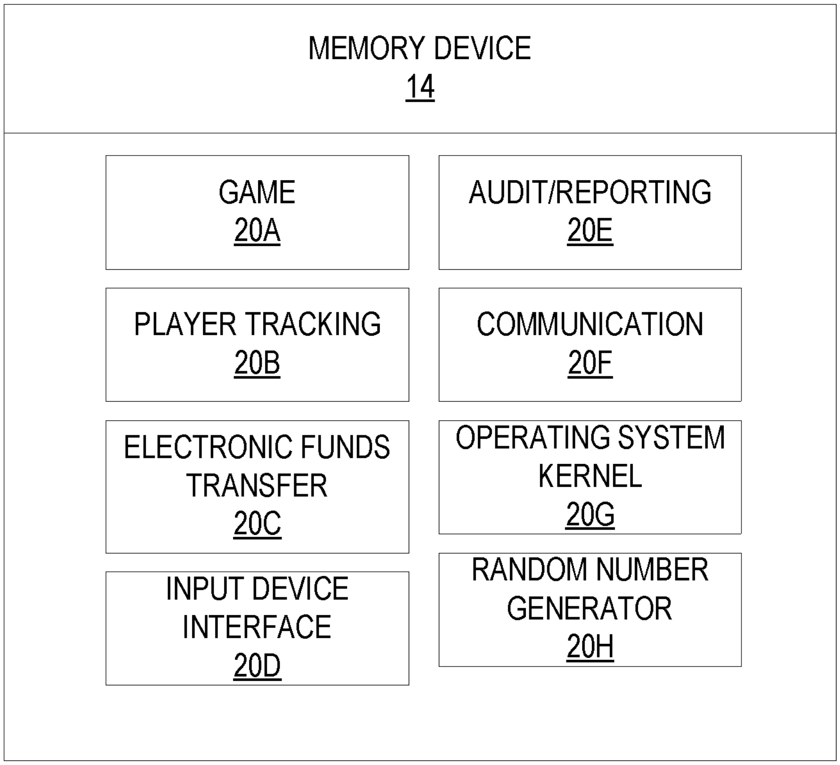
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
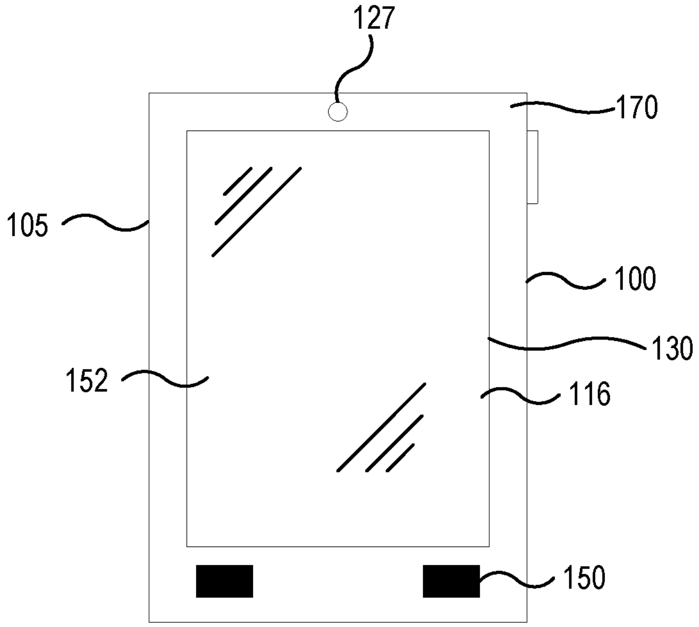
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
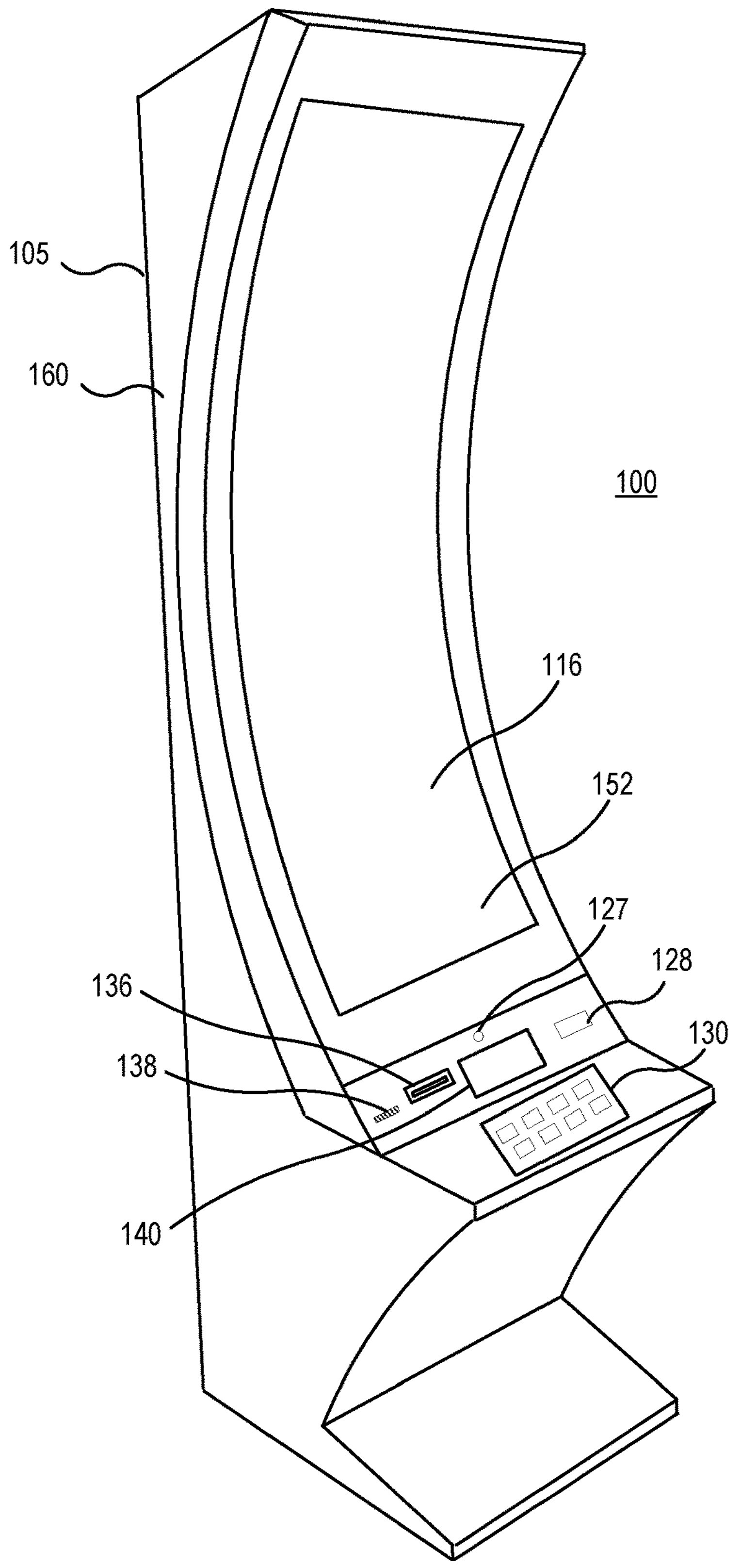
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

FIGS. 3A-3F are diagrams of a graphical user interface (GUI) 300 for a wagering game that includes a bonus multiplier for adjacent bonus game symbols, according to some embodiments. The GUI 300 may include a credit meter 302 indicative of a current credit meter balance, and a wager indicator 304 indicative of a current wager, as desired. In this example, the wagering game is a key number match game, but it should be understood that many different types of wagering games may be used with features disclosed herein.

In this example, the GUI 300 includes a plurality of game elements 306, including an array 307 of game symbol positions 308 for a plurality of respective game symbols 310, i.e., randomly determined numbers in this example. The GUI 300 also includes a plurality of key number selections 312, which may be selected by a player of the wagering game and/or randomly selected, as desired, following receipt of a wager.

Figure 3A:
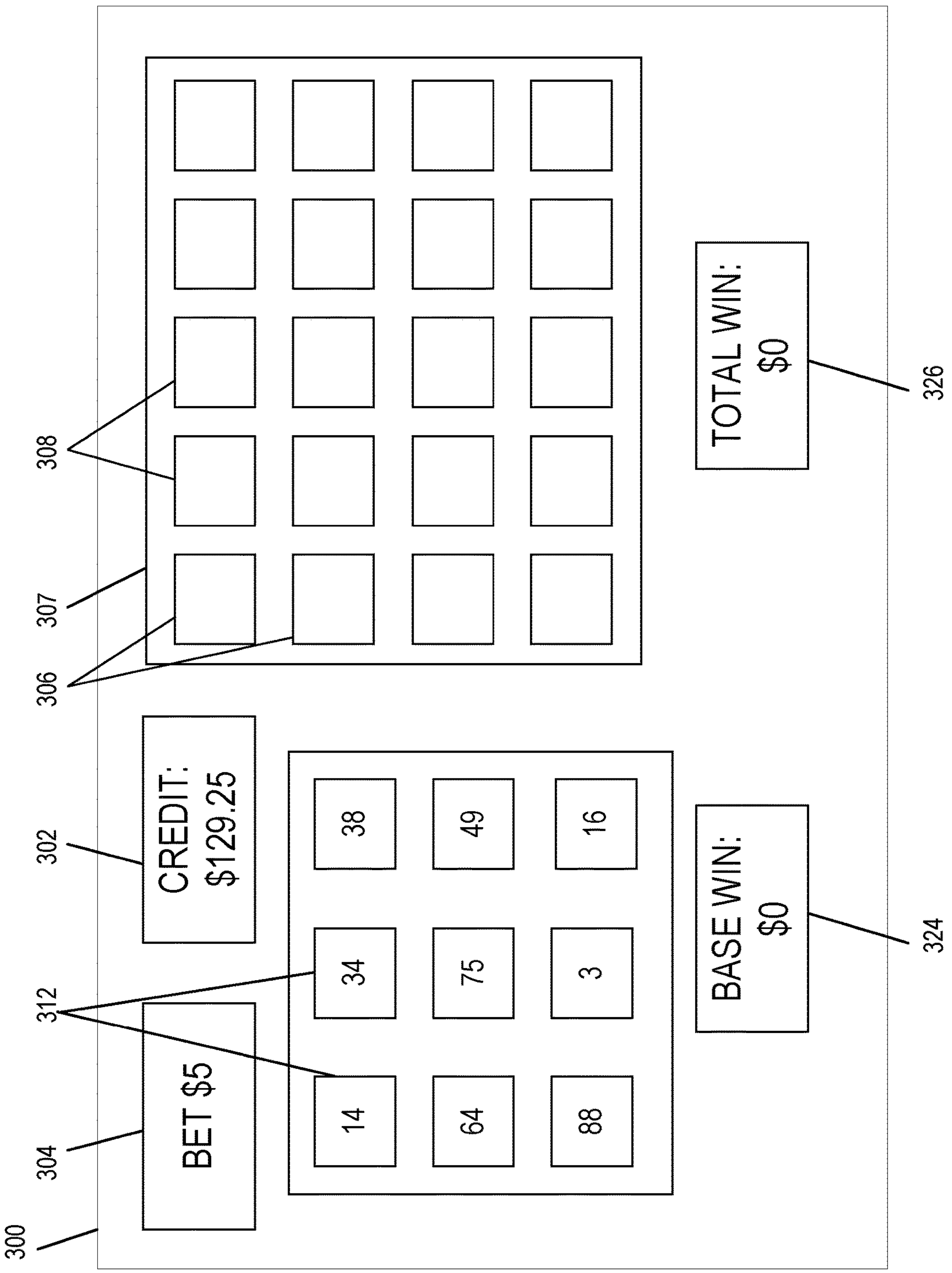
FIGS. 3A-3F are diagrams of a graphical user interface (GUI) for a wagering game that includes a bonus multiplier for adjacent bonus game symbols, according to some embodiments.
Figure 3B:
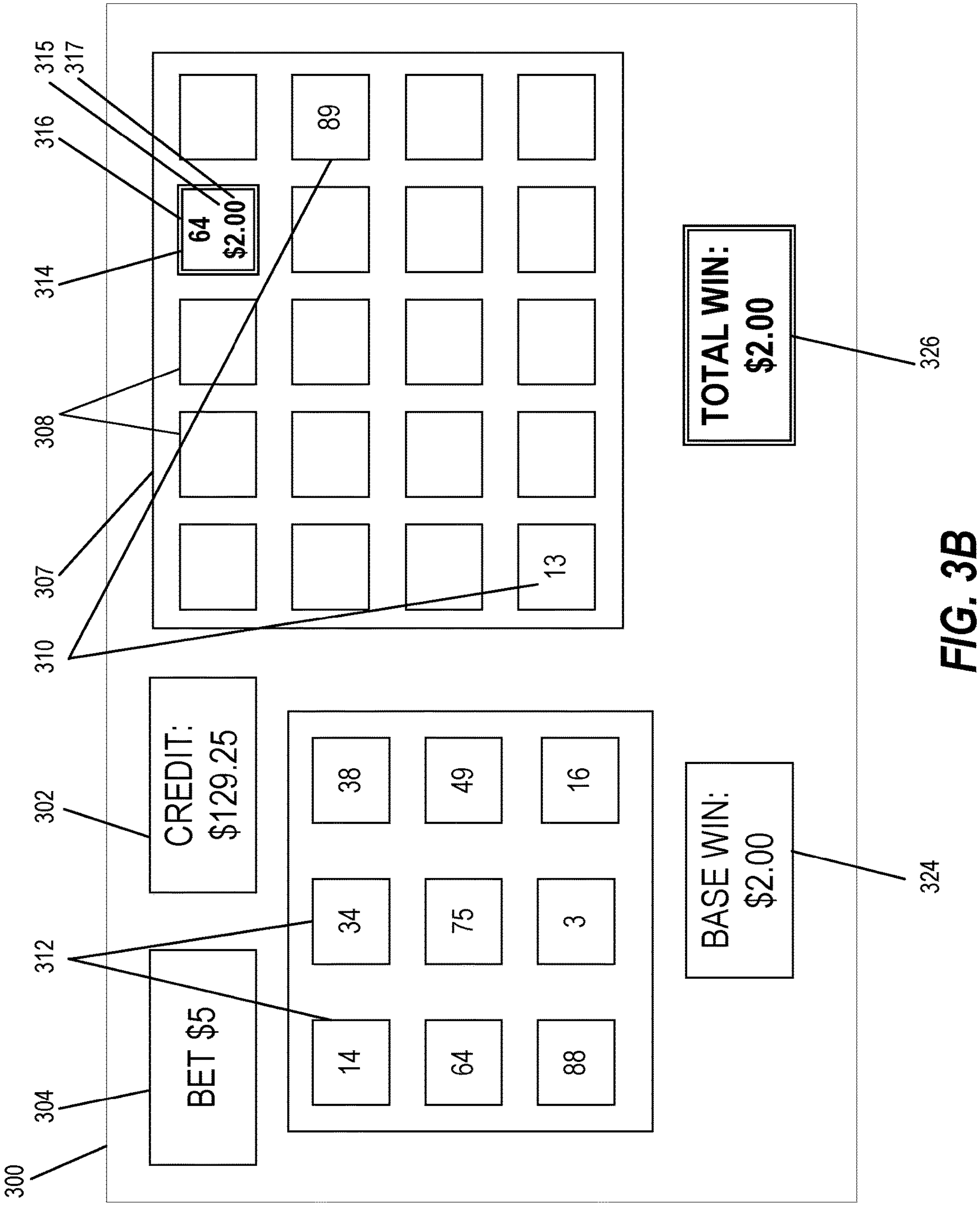

As shown by FIG. 3B, game symbols 310 are revealed during play of the wagering game, with matching symbols 314, i.e., numbers that match one of the key number selections 312, being associated with a base game award component 315. For example, the numbers associated with game symbols 310 may be compared with the plurality of key number selections 312, with a first matching symbol 316 having a first game award value 317 being designated based on the first matching symbol 316 matching one of the key number selections 312. The first game award value 317 is added to a first total game award value 324 in the GUI 300.

Figure 3C:
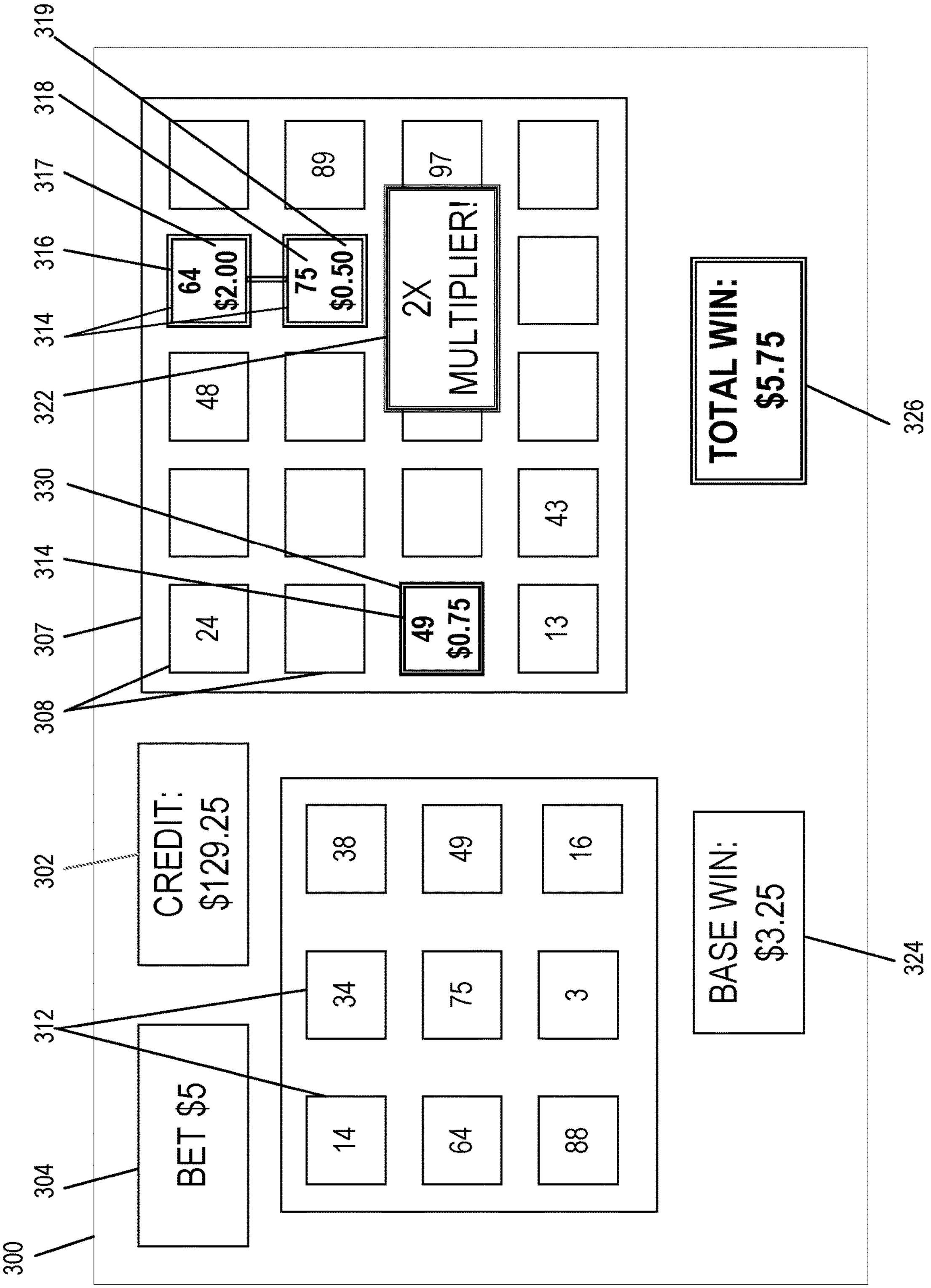

As shown by FIG. 3C, as additional matching symbols 314 are revealed, some matching symbols 314 may be adjacent each other in the array 307. In this example, the array 307 is an orthogonal array, such that game symbol positions 308 may be adjacent each other in one of the four orthogonal directions, i.e., vertically up or down, or horizontally right or left. It should be understood, however, that other types of arrays may have different criteria for determining adjacency, such as the hexagonal array 407 of FIGS. 4A-4B below, for example.

Here, a second matching symbol 318 with a second game award value 319 is revealed adjacent the first matching symbol 316. In this example, a multiplier 322 is displayed based on a total number of adjacent matching symbols 314. Here, because there are two adjacent matching symbols 314, i.e., first matching symbol 316 and second matching symbol 318, the multiplier 322 is a 2× bonus multiplier, indicating that a portion of the first total game award value 324 will be multiplied by 2 to determine an increased total game award value 326. In this example, the multiplier 322 is applied to the game award values associated with the adjacent matching symbols 314. In this example, other non-adjacent matching symbols 314, such as symbol 330, may contribute to the first total game award value 324, but will not receive the benefit of the multiplier 322. As a result, in this example, the game award values 317 and 319 are multiplied by the 2× multiplier 322 and added to the other game award values (i.e., for standalone matching symbol 330) to produce the increased total game award value 326. It should also be understood other arrangements may be used, as desired. For example, in some embodiments, the increased total game award value 326 maybe the product of the entire first total game award value 324 times the multiplier 322.

Figure 3D:
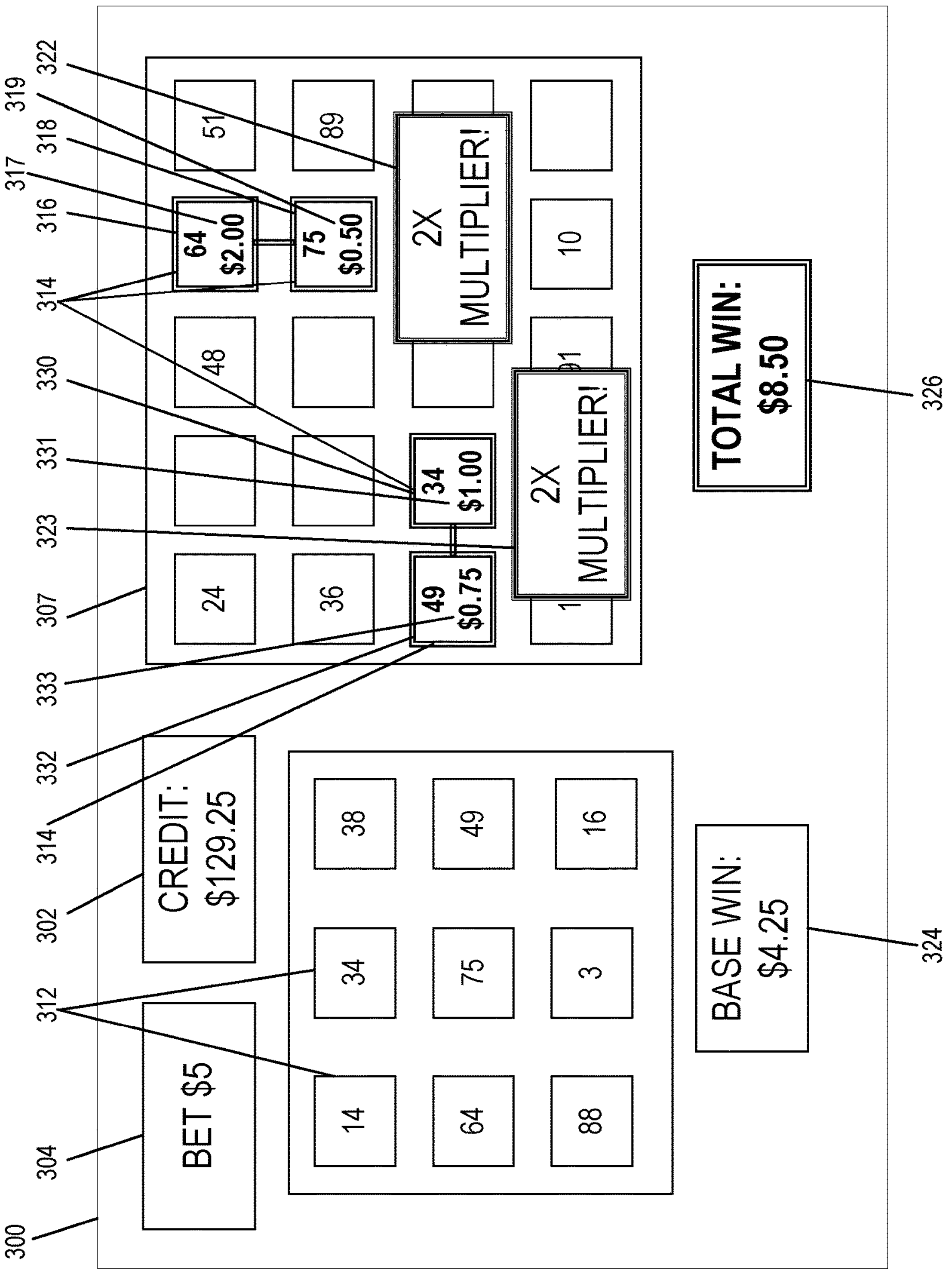
Figure 3E:
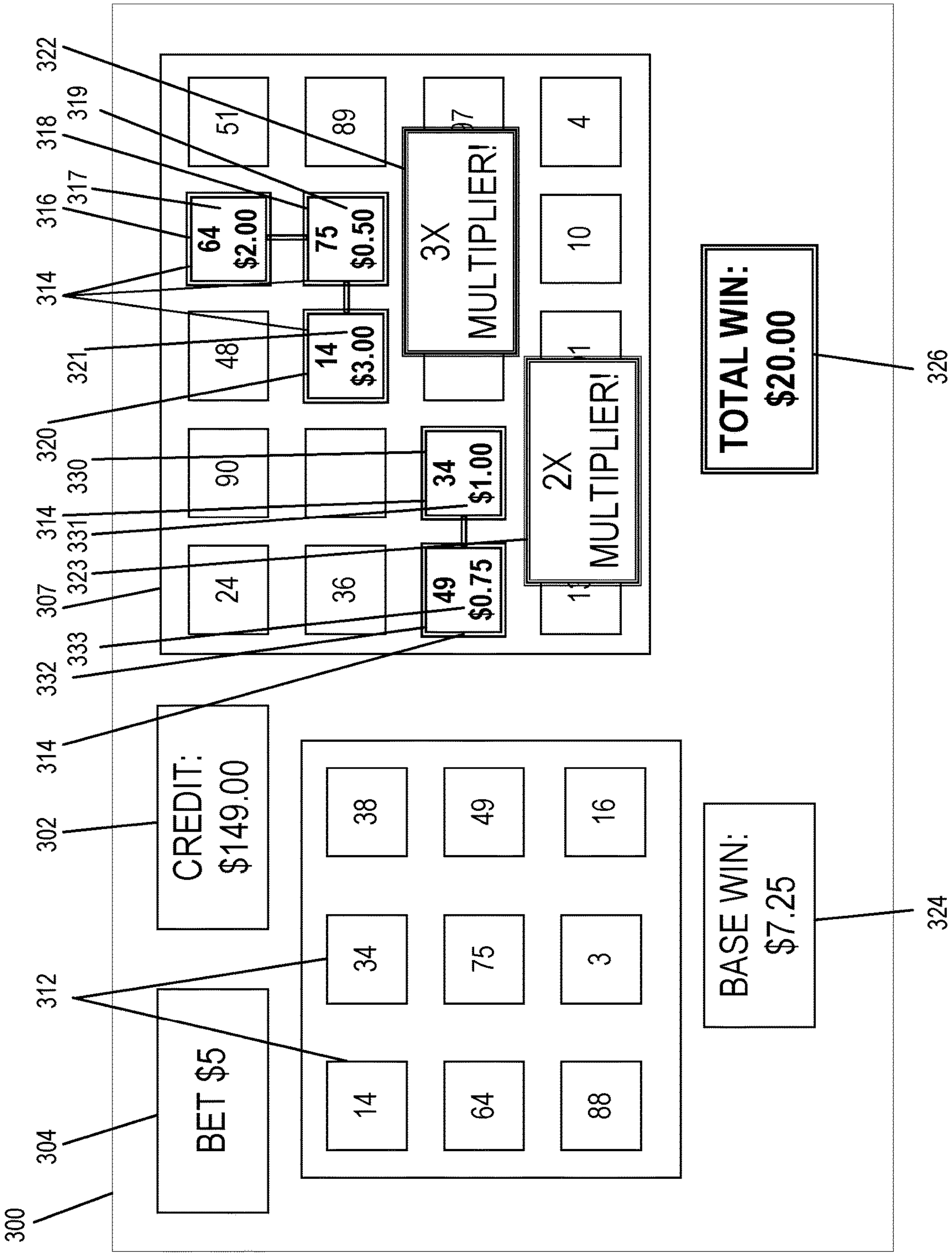

As shown by FIGS. 3D and 3E, additional groups of adjacent matching symbols 314 may be revealed with their own independent multiplier 323. In FIG. 3D, another matching symbol 332 is revealed adjacent matching symbol 330, producing a separate 2× multiplier 323. The 2× multiplier 322 is applied to the sum of game award values 317, 319, and the independent 2× multiplier 323 is applied to the sum of game award values 331, 333. In FIG. 3E, another matching symbol 320 is revealed adjacent matching symbol 318, which increases the multiplier 322 to a 3× multiplier while leaving the other 2× multiplier 323 unchanged. The 3× multiplier 322 is applied to the sum of game award values 317, 319, 321, and the 2× multiplier 323 is applied to the sum of game award values 331, 333.

Figure 3F:
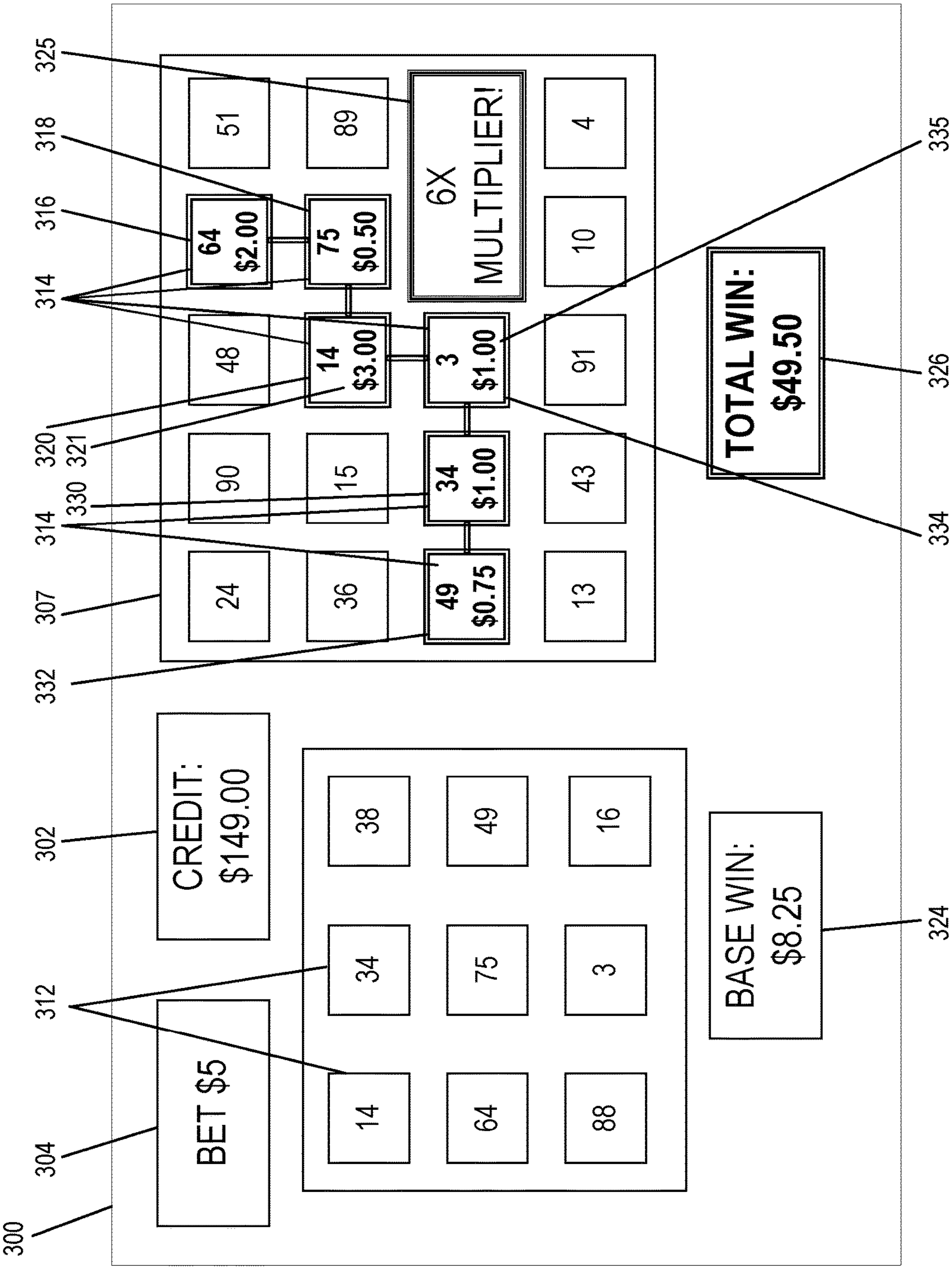

As shown by FIG. 3F, additional matching symbols 314 may be revealed to join two groups of adjacent matching symbols 314. In FIG. 3F, a matching game symbol 334 is revealed adjacent to both game symbol 320 (associated with multiplier 322 in FIG. 3E) and game symbol 330 (associated with multiplier 323 in FIG. 3E). In this example, the groups of matching symbols 314 are combined and produce a larger, combined multiplier 325 (a 6× multiplier in this example), which is applied to the sum of the award values 317, 319, 321, 331, 333, and 335.

In some examples, as noted above, other types of awards may be provided, and need not be an exact multiplication of a base win. For example, adjacent matching symbols 314 may result in in-game enhancements or features, such as improved odds for a subsequent wagering game, more favorable paytables, etc., and/or may cause special symbols to be provided for a subsequent bonus game. Alternatively, or in addition, adjacent matching symbols 314 may allow for additional key number selections 312 in a subsequent game.

In some examples, the increased total game award value 326 may be determined and/or displayed in real time or near real time as game symbols 310 are revealed, or the increased total game award value 326 may be determined and/or displayed at the conclusion of the wagering game, as desired.

Figure 4A:
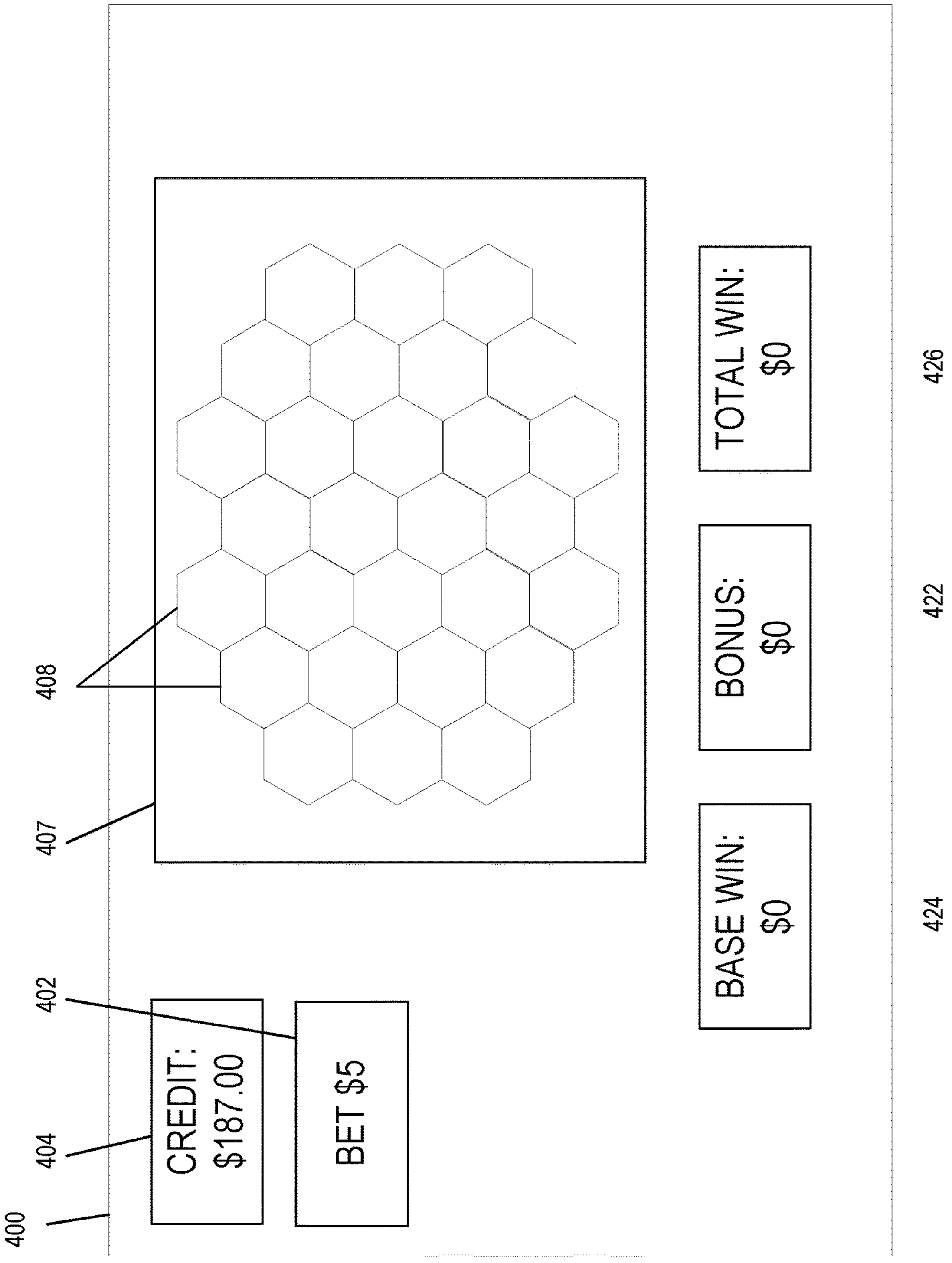
FIGS. 4A and 4B are diagrams of a graphical user interface (GUI) for a wagering game that includes a bonus award for adjacent bonus game symbols in hexagonal array, according to some embodiments.
Figure 4B:
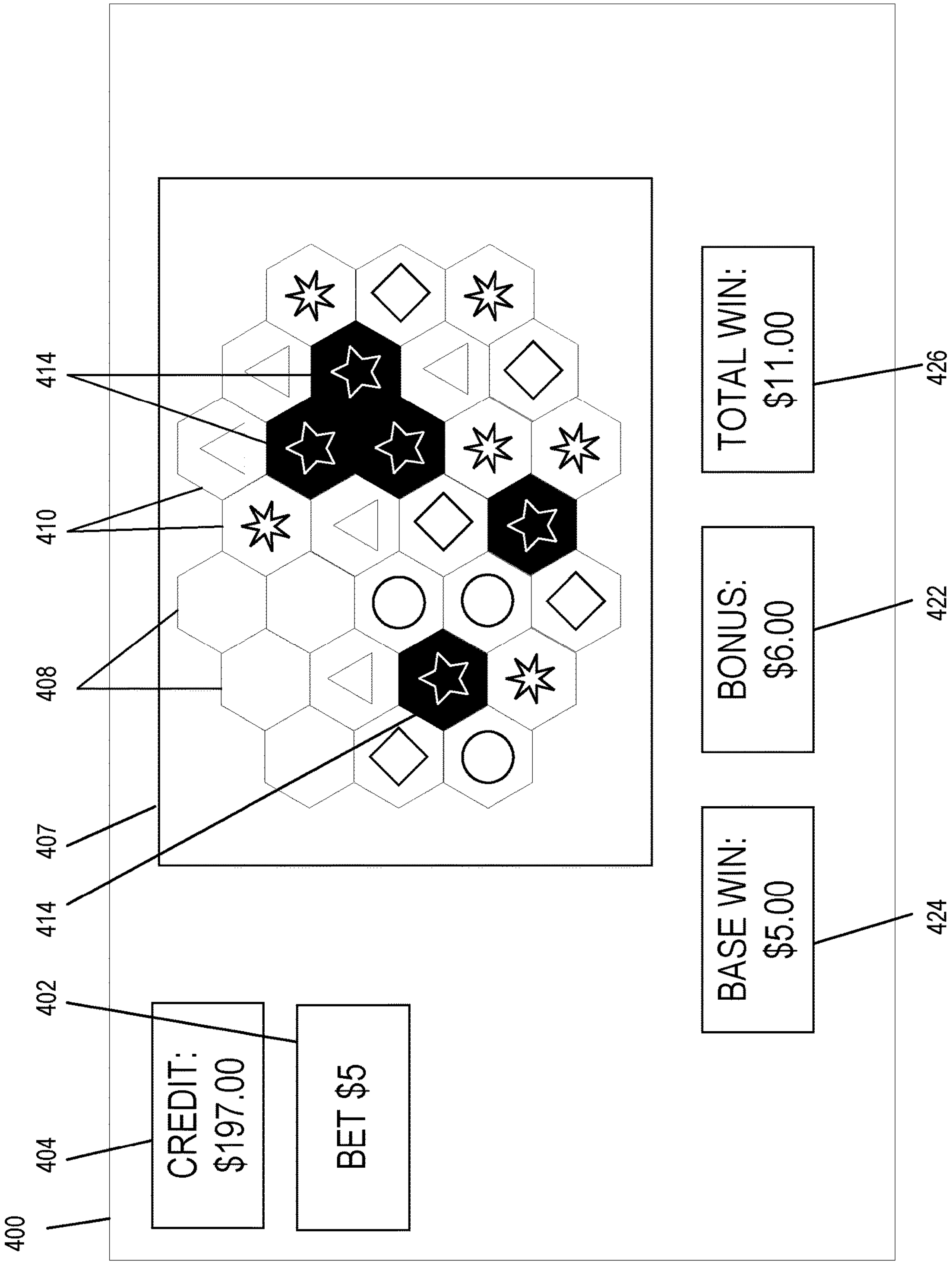

FIGS. 4A-4B are diagrams of a graphical user interface (GUI) 400 for a wagering game including a bonus award for adjacent bonus game symbols in hexagonal array, according to some embodiments. Similar to the embodiment of FIG. 3A-3E, the GUI 400 if FIGS. 4A-4B may include a credit meter 402 indicative of a current credit meter balance, and a wager indicator 404 indicative of a current wager, as desired. In this example, the wagering game is a slot-style game, but it should be understood that many different types of wagering games may be used with features disclosed herein.

In the example of 4A-4B, the GUI 400 includes a plurality of game elements, including a hexagonal array 407 of game symbol positions 408 for a plurality of respective game symbols 410, i.e., slot symbols in this example, which may be randomly determined following receipt of a wager, e.g., at an EGM or gaming system for example.

In this example, as shown by FIG. 4B, game symbols 410 are randomly determined during play of the wagering game, with special symbols 414, i.e., bonus slot symbols in this example, being associated with a game award value. In this example, each special symbol 414 has a standard game award value (e.g., $1.00), but it should be understood that different and/or variable game award values can be used, as desired. As the slot symbols 410 are determined and displayed, some special symbols 414 may be adjacent each other in the array 407. In this example, determination whether game symbol positions 408 are adjacent to each other is based on a determination whether the game symbol positions 408 are adjacent in one of six hexagonal directions.

In this example, a first total game award value 424 is based on a sum of the game award values associated with the special symbols 414, i.e., $5.00 in this example. A bonus award value 422 may increase as additional adjacent matching symbols 414 are revealed. In this example, the bonus award value 422 is $6.00 based on three adjacent special symbols 414, but it should be understood that different and/or variable bonus award values can be used, as desired. After all of the game symbols 410 are revealed, a first total game award value 424 and a total bonus award value 422 are determined. The first total game award value 424 is added to the total bonus award value 422 to determine the increased total game award value 426, which is awarded to the player as a game award.

Figure 5A:
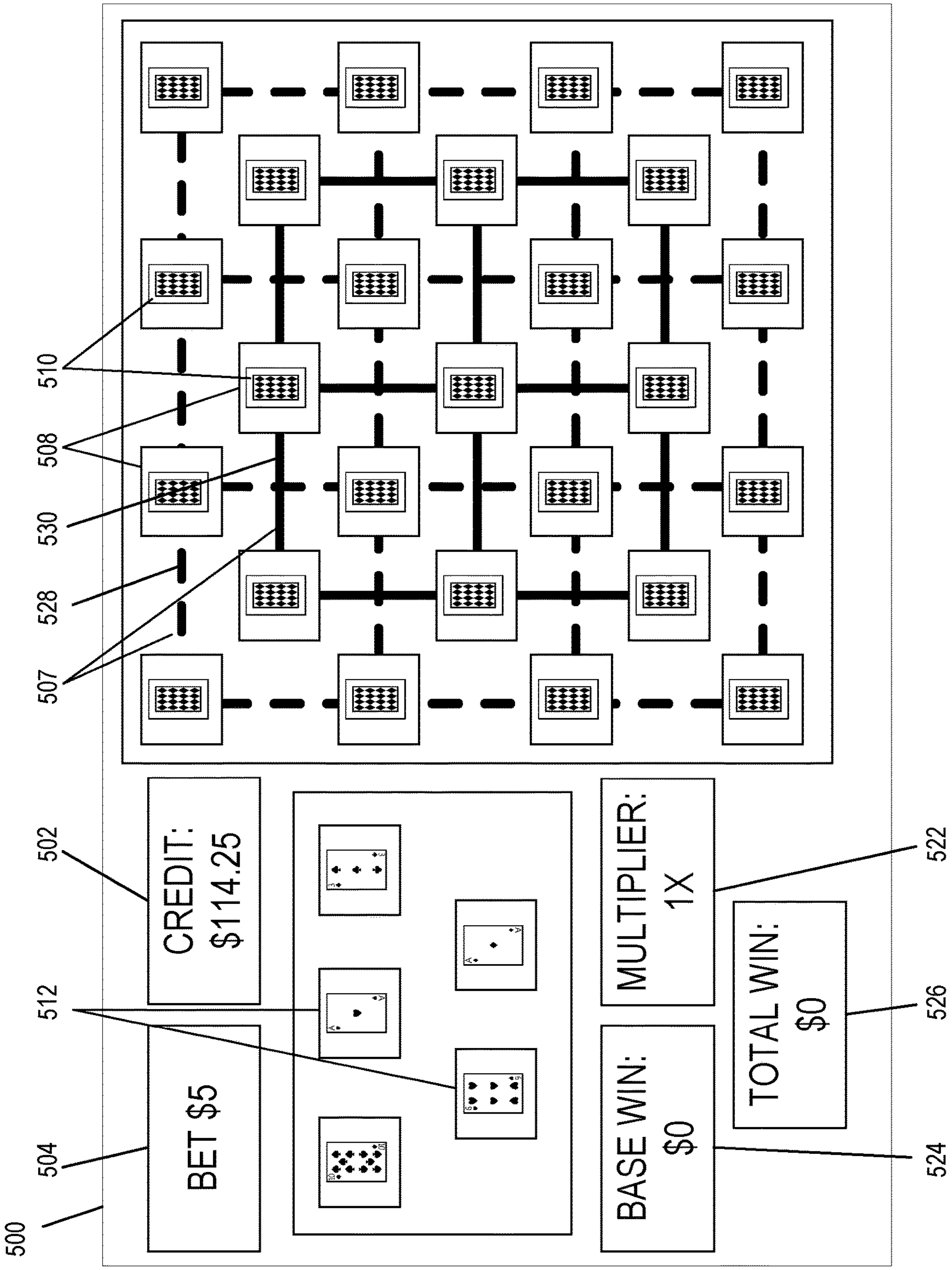
FIGS. 5A and 5B are diagrams of a graphical user interface (GUI) for a wagering game that includes a plurality of overlapping arrays, with a bonus award for adjacent bonus game symbols in one of the arrays, according to some embodiments.
Figure 5B:
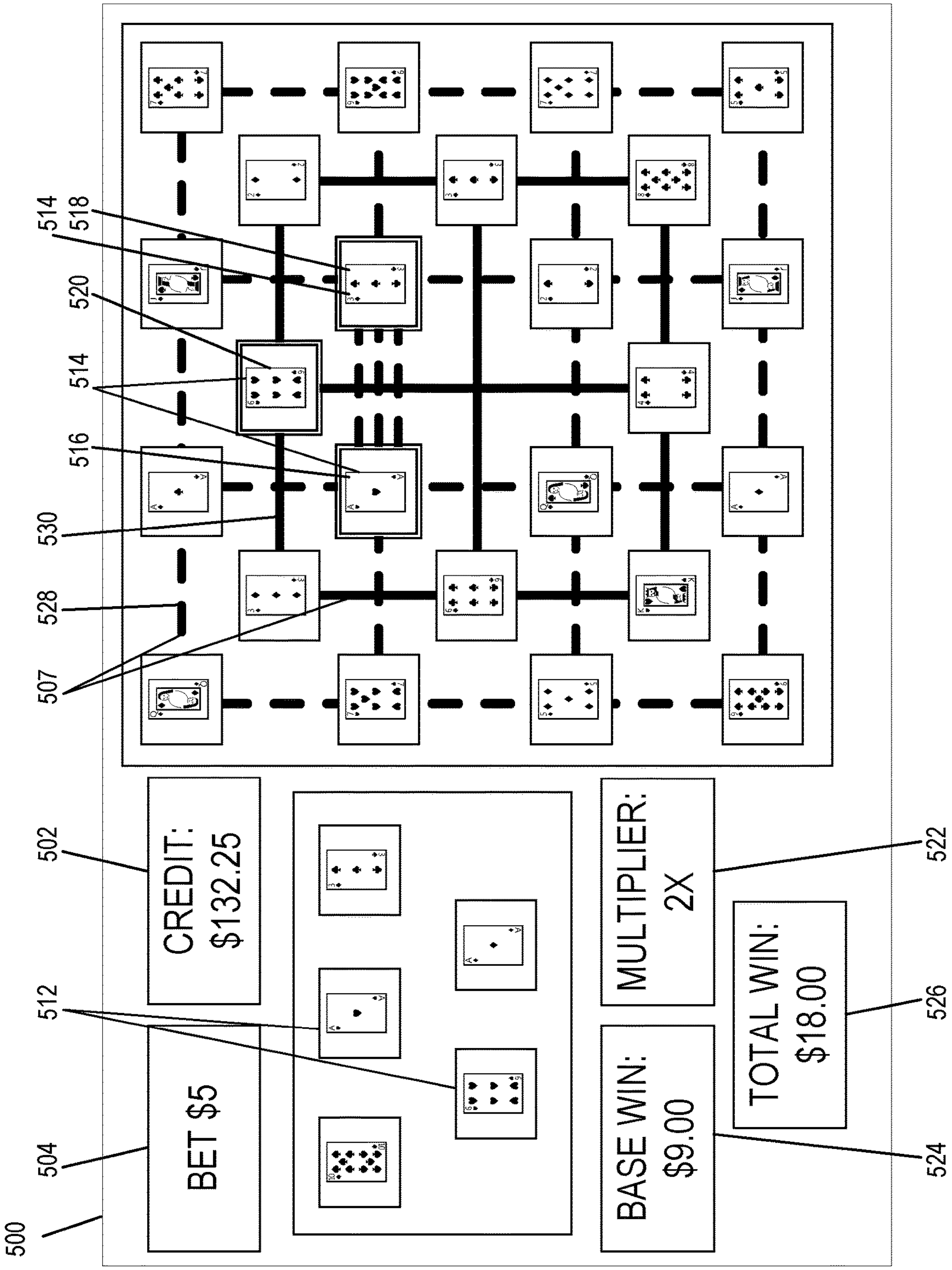

FIGS. 5A-5B are diagrams of a graphical user interface (GUI) 500 for a wagering game includes a plurality of overlapping arrays 507, according to some embodiments. Similar to the embodiment of FIG. 3A-3E, the GUI 500 if FIGS. 5A-5B may include a credit meter 502 indicative of a current credit meter balance, and a wager indicator 504 indicative of a current wager, as desired. In this example, the wagering game is a playing-card matching-style game, but it should be understood that many different types of wagering games may be used with features disclosed herein.

In this example, the GUI 500 includes a plurality of playing card selections 512, which may be selected by a player of the wagering game and/or randomly selected, as desired, following receipt of a wager. The game elements also include a plurality of game symbol positions 508 in a plurality of arrays 507. In this example, the arrays 507 include a first orthogonal array 528 and a second orthogonal array 530 that is horizontally and vertically offset from the first array 528 and that overlaps the first array 528.

In this example, as shown by FIG. 5B, game symbols 510 (playing cards in this example) are revealed during play of the wagering game, with matching symbols 514, i.e., numbers that match one of the playing card selections 512, being associated with a game award value. In this example, each matching symbols 514 has a standard game award value (e.g., $3.00 in this example), but it should be understood that different and/or variable game award values can be used, as desired. As additional matching symbols 514 are revealed, some matching symbols 514 in the respective arrays 528, 530 may be adjacent each other. For example, in this example, a first matching symbol 516 and a second matching symbol 518 are adjacent each other in the first array 528, but a third matching symbol 520 in the second array 530 is not considered to be adjacent to the first matching symbol 516 or the second matching symbol 518 in the first array 528, despite the proximity of the third matching symbol 520 to the first matching symbol 516 and the second matching symbol 518. That is, determination whether the particular game symbol positions 508 are adjacent to each other in a particular array 528, 530 is based on a determination whether the particular game symbol positions 508 are adjacent to each other in the same array 528, 530. This and other features may add a layer of complexity to the wagering game, which may in turn increase player engagement and enjoyment.

As shown by FIG. 5B, a first total game award value 524 is based on a sum of the game award values associated with the special symbols 514. A bonus multiplier 522 may increase as additional adjacent matching symbols 516 are revealed. In this example, the bonus multiplier 522 is determined based on a combination of adjacent matching symbols 516 in the first array 528 and the second array 530, but it should be understood that the bonus multiplier 522 or other bonus award value may be determined based on any number of criteria. The first total game award value 524 is multiplied by the total multiplier 522 to determine the increased total game award value 526, which is awarded to the player as a game award.

Figure 6:
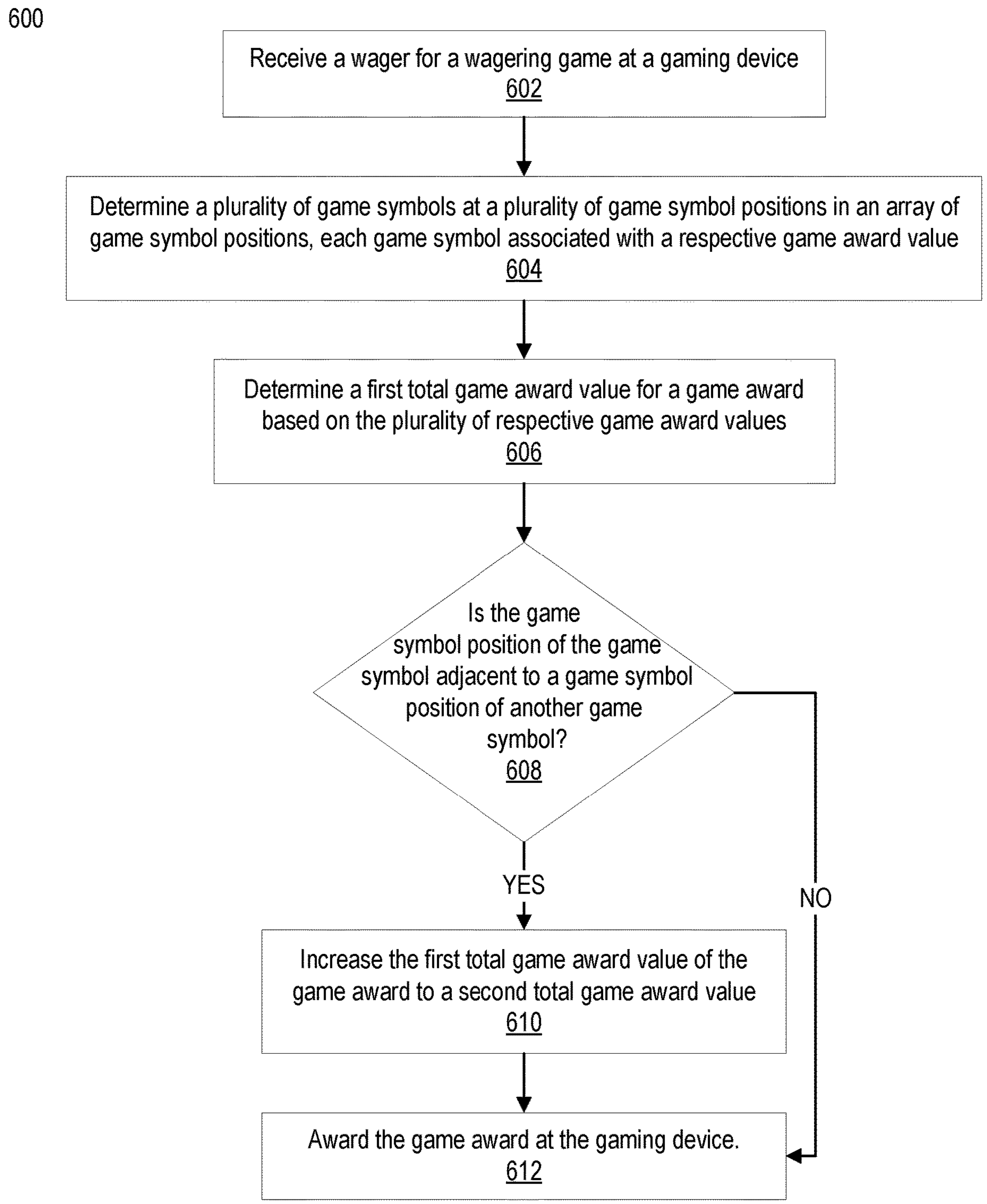
FIG. 6 is a flowchart illustrating operations of systems/methods of providing a replacement game award, according to some embodiments.

FIG. 6 is a flowchart illustrating operations 600 of systems/methods for facilitating embodiments described herein. The operations 600 may be performed by one or more processor circuits of one or more computing devices, such as any of the computing devices described herein, for example. The operations 600 may include receiving a wager for a wagering game at a gaming device (Block 602), the wagering game comprising an array of game symbol positions, such as the array 307 of FIGS. 3A-3E for example.

The operations 600 may further include determining, by a processor circuit of the gaming device, a plurality of game symbols at a plurality of game symbol positions in the array, each game symbol of the plurality of game symbols associated with a respective game award value (Block 604). For example, the matching symbols 314, i.e., numbers that match one of the key number selections 312, in FIGS. 3A-3E each include a respective game award value, e.g., base game award component 315.

The operations 600 may further include determining, by the processor circuit, a first total game award value for a game award based on the plurality of respective game award values (Block 606). Referring again to the example of FIGS. 3A-3E, game award values 315 of the matching symbols 314 are added together to generate a first total game award value 324, i.e., a total base game award without applying a multiplier.

The operations 600 may further include determining, by the processor circuit, for each game symbol of the plurality of game symbols, whether the game symbol position of the game symbol is adjacent to a game symbol position of another game symbol of the plurality of game symbols (Block 608). Based on a determination that a plurality of game symbols are adjacent to each other, the operations 600 may further include increasing, by the processor circuit, the first total game award value of the game award to a second total game award value (Block 610). In some embodiments, increasing may include multiplying the first total game award value by a multiplier, wherein the second total game award value comprises the product of the first total game award value times the multiplier. For example, in the embodiment of FIGS. 3A-3E, a determination that three matching symbols 314, i.e., symbols 316, 318, 320, are adjacent each other increases a multiplier 322 to a 3× bonus multiplier, thereby increasing the first total game award value 324 to an increased total game award value 326. The operations 600 may further include awarding the game award at the gaming device (Block 612), which includes the second, i.e., increased, total game award value.

Based on a determination that a plurality of game symbols are not adjacent to each other, e.g., that none of the winning or matching game symbols are adjacent any other winning or matching game symbol for example, the operations 600 may further include awarding the game award at the gaming device (Block 612), which includes the first, i.e., base, total game award value.

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games and displays those plays via the internet browser of the gaming device.

It should be appreciated that the central server, central controller, or remote host and the gaming device are configured to connect to the data network or remote communications link in any suitable manner. In various embodiments, such a connection is accomplished via a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A game controller for an Electronic Gaming Machine (EGM) comprising:

- a random number generator;
- a processor circuit; and
- a memory comprising machine-readable instructions that, when executed by the processor circuit, cause the processor circuit to:
  - control a Graphical User Interface (GUI) of the EGM to receive a wager for a wagering game at the EGM, the wagering game comprising an array of game symbol positions;
  - control the GUI to display, based on a random number generated by the random number generator, a first game symbol associated with a first game award value at a first game symbol position of the array of game symbol positions;
  - control the GUI to display, based on the random number generated by the random number generator, a second game symbol associated with a second game award value at a second game symbol position of the array of game symbol positions;
  - determine a first total game award value for a game award based on the first game award value and the second game award value;
  - determine whether the first game symbol position is adjacent to the second game symbol position in the array of game symbol positions;
  - based on a determination that the first game symbol position is adjacent to the second game symbol position in the array of game symbol positions, increase the first total game award value of the game award to a second total game award value;
  - control the GUI to display an indication of the game award; and
  - award the game award comprising the second total game award value.

2. The game controller of claim 1, wherein the instructions further cause the processor circuit to:

- control the GUI to display a third game symbol associated with a third game award value at a third game symbol position of the array of game symbol positions;
- determine whether the third game symbol position is adjacent to one of the first game symbol position and the second game symbol position in the array of game symbol positions; and
- based on a determination that the third game symbol position is adjacent to one of the first game symbol position and the second game symbol position in the array of game symbol positions, increase the second total game award value of the game award to a third total game award.

3. The game controller of claim 1, wherein the first game symbol and the second game symbol comprise numbers.

4. The game controller of claim 3, wherein instructions that determine the first game symbol further cause the processor circuit to:

- compare a first number associated with the first game symbol position to a plurality of selected numbers associated with the wager;
- in response to the first number matching one of the plurality of selected numbers, designate the first number as the first game symbol;
- compare a second number associated with the second game symbol position with the plurality of selected numbers; and
- in response to the second number matching one of the plurality of selected numbers, designate the second number as the second game symbol.

5. The game controller of claim 1, wherein the first game award value and the second game award value comprise monetary values; and

- wherein the first total game award value comprises a sum of the first game award value and the second game award value.

6. The game controller of claim 1, wherein the instructions that cause the processor circuit to increase the first total game award value of the game award to the second total game award value further cause the processor circuit to:

- multiply the first total game award value by a multiplier, wherein the second total game award value comprises a product of the first total game award value times the multiplier.

7. The game controller of claim 6, wherein a multiplier value of the multiplier is proportional to a total number of adjacent game symbols associated with game award values.

8. The game controller of claim 6, wherein a multiplier value of the multiplier is not proportional to a total number of adjacent game symbols associated with game award values, such that a first ratio of a first multiplier associated with a first number of adjacent game symbols is lower than a second ratio of a second multiplier associated with a second number of adjacent game symbols higher than the first number of adjacent game symbols.

9. The game controller of claim 1, wherein the first game symbol and the second game symbol comprise slot symbols.

10. The game controller of claim 1, wherein the instructions further cause the processor circuit to, based on the determination that the first game symbol position is adjacent to the second game symbol position in the array of game symbol positions, provide a game feature in a subsequent wagering game comprising improved odds for the wagering game.

11. The game controller of claim 1, wherein the array of game symbol positions comprises an orthogonal array, and

- wherein the determination of whether the first game symbol position is adjacent to the second game symbol position in the array of game symbol positions is based on a determination of whether the first game symbol is adjacent to the second game symbol in one of four orthogonal directions.

12. The game controller of claim 1, wherein the array of game symbol positions comprises a hexagonal array, and

- wherein the determination of whether the first game symbol position is adjacent to the second game symbol position in the array of game symbol positions is based on a determination of whether the first game symbol is adjacent to the second game symbol in one of six hexagonal directions.

13. The game controller of claim 1, wherein the array of game symbol positions comprises a plurality of arrays of game symbols, and wherein the determination of whether the first game symbol position is adjacent to the second game symbol position in the array of game symbol positions is further based on a determination of whether the first game symbol and the second game symbol are in the same array of the plurality of arrays.

14. An Electronic Gaming Machine (EGM) comprising:

a display device;

an input device;

a dispenser device;

a game controller comprising a processor circuit; and a memory comprising machine-readable instructions that, when executed by the processor circuit, cause the processor circuit to:

receive a wager for a wagering game at the input device, the wagering game comprising an array of game symbol positions;

control a Graphical User Interface (GUI) of the display device to display a plurality of game symbols at a plurality of game symbol positions in an array of game symbol positions, each game symbol of the plurality of game symbols associated with a respective game award value;

determine, for each game symbol of the plurality of game symbols, whether the game symbol position of the game symbol is adjacent to a game symbol position of another game symbol of the plurality of game symbols;

based on a determination that a first plurality of game symbols are adjacent to each other, determine a first subtotal game award value based on the respective game award values of the first plurality of game symbols;

increase the first subtotal game award value to a second subtotal game award value;

based on a determination that a second plurality of game symbols are adjacent to each other, determine a third subtotal game award value based on the respective game award values of the second plurality of game symbols;

increase the third subtotal game award value to a fourth subtotal game award value;

control the GUI to display an indication of a game award comprising the second subtotal game award value and the fourth subtotal game award value; and award, by the dispenser device, the game award.

15. The EGM of claim 14, wherein the plurality of game symbols comprises numbers.

16. The EGM of claim 15, wherein instructions that determine the first plurality of game symbols further cause the processor circuit to:

compare, for each game symbol position, a number associated with the game symbol position to a plurality of selected numbers associated with the wager; and for each game symbol position, in response to the number matching one of the plurality of selected numbers, designate the number as one of the first plurality of game symbols.

17. The EGM of claim 16, wherein instructions that determine the second plurality of game symbols further cause the processor circuit to:

compare, for each game symbol position, a number associated with the game symbol position to a plurality of selected numbers associated with the wager; and for each game symbol position, in response to the number matching one of the plurality of selected numbers, designate the number as one of the second plurality of game symbols.

18. The EGM of claim 14, wherein the instructions that cause the processor circuit to increase the first subtotal game award value to the second subtotal game award value further cause the processor circuit to:

multiply the first subtotal game award value by a first multiplier, wherein the second subtotal game award value comprises a product of the first subtotal game award value times the first multiplier, and wherein the instructions that cause the processor circuit to increase the third subtotal game award value to the fourth subtotal game award value further cause the processor circuit to:

multiply the third subtotal game award value by a second multiplier, wherein the fourth subtotal game award value comprises the product of the third subtotal game award value times the second multiplier.

19. The EGM of claim 18, wherein the first multiplier is based on a total number of adjacent game symbols in the first plurality of game symbols, and wherein the second multiplier is based on a total number of adjacent game symbols in the second plurality of game symbols.

20. A method comprising:

receiving a wager for a wagering game at an Electronic Gaming Machine (EGM), the wagering game comprising an array of game symbol positions;

determining, by a processor circuit of a game controller of the EGM, a plurality of game symbols at a plurality of game symbol positions in the array of game symbol positions, each game symbol of the plurality of game symbols associated with a respective game award value;

controlling a Graphical User Interface (GUI) to present, by a display device, the array of game symbol positions comprising the plurality of game symbols at the plurality of game symbol positions;

determining, by the processor circuit, a first total game award value for a game award based on the plurality of respective game award values;

determining, by the processor circuit, for each game symbol of the plurality of game symbols, whether the game symbol position of the game symbol is adjacent to a game symbol position of another game symbol of the plurality of game symbols;

based on a determination that a plurality of game symbols are adjacent to each other, increasing, by the processor circuit, the first total game award value of the game award to a second total game award value;

controlling the GUI to present, by the display device, an indication of the game award; and awarding the game award at the EGM.

* * * * *